(12) United States Patent
Burdin et al.

(10) Patent No.: US 7,402,203 B2
(45) Date of Patent: Jul. 22, 2008

(54) HIGH-WEARING-RESISTANT COMPOSITE MATERIAL COMPRISING STEEL-BASED SHOT AND METHOD FOR PRODUCING SAID MATERIAL

(75) Inventors: Jacques Burdin, Chambery (FR); Daniel Vachey, Bassens (FR); Gerard Mariotti, La Ravoire (FR); Aline Minier, Claix (FR)

(73) Assignee: Wheelabrator-Allevard, Le Cheylas (FR)

( * ) Notice: Subject to any disclaimer, the term of this patent is extended or adjusted under 35 U.S.C. 154(b) by 237 days.

(21) Appl. No.: 10/569,649

(22) PCT Filed: Sep. 14, 2004

(86) PCT No.: PCT/FR2004/002326

§ 371 (c)(1),
(2), (4) Date: Feb. 27, 2006

(87) PCT Pub. No.: WO2005/040061

PCT Pub. Date: May 6, 2005

(65) Prior Publication Data

US 2006/0243168 A1    Nov. 2, 2006

(30) Foreign Application Priority Data

Sep. 15, 2003   (FR)   ................... 03 10783

(51) Int. Cl.
*C04B 14/34* (2006.01)
*C04B 14/04* (2006.01)
*B28B 1/00* (2006.01)
*B28B 1/14* (2006.01)
*B28B 1/24* (2006.01)
*B28B 3/20* (2006.01)

(52) U.S. Cl. .................. 106/643; 106/640; 264/211.11; 264/211.12; 264/212; 264/328.1; 264/333; 264/638; 264/645

(58) Field of Classification Search ................. 106/640, 106/643; 264/333, 211.11, 211.12, 212, 264/328.1, 638, 645
See application file for complete search history.

(56) References Cited

U.S. PATENT DOCUMENTS 4,482,385 A    11/1984   Satkowski et al.

FOREIGN PATENT DOCUMENTS

| EP | 0 934 915 A1 | 8/1999 |
| FR | 2 640 962 | 6/1990 |
| GB | 1025936 | 4/1966 |
| JP | A 7-276340 | 10/1995 |
| RU | 2189366 C2 * | 9/2002 |
| WO | WO 90/13524 | 11/1990 |

OTHER PUBLICATIONS

Derwent-Acc-No.: 1990-248852, abstract of France Patent Application No. 2,640,962 A (Jun. 1990).*
Derwent-Acc-No.: 1995-400107, abstract of Japan Patent Application No. 07-276340A (Oct. 1995).*
Derwent-Acc-No.: 1999-446286, abstract of EPO Patent Application No. 934915 A1 (Aug. 1999).*
Atis et al. "Relation between abrasion resistance and flexural strength of high volume fly ash concrete." *Materials and Structures*, vol. 35, May 2002. pp. 257-260.

* cited by examiner

*Primary Examiner*—Anthony J Green
(74) *Attorney, Agent, or Firm*—Oliff & Berridge, PLC (57) ABSTRACT

A composite material is obtained by mixing with water 100 parts in weight of binder, between 250 and 800 parts in weight of steel-based shot having a granulometric distribution comprised between 120 jim and 3000 jim, between 10 and 15 parts in weight of non-densified silica fume and a highly water-reducing superplasticizer. The ratio between the weight quantity of water and the weight quantity of hydraulic binder is comprised between 0.16 and 0.25. The composite material presents a very high abrasion resistance, an abrasion index measured according to the C.N.R protocol comprised between 0.15 and 1.0, the value of the D10 grain size of the shot being at least eight times greater than the value of the D90 grain size of the hydraulic binder.

23 Claims, 7 Drawing Sheets

HIGH-WEARING-RESISTANT COMPOSITE MATERIAL COMPRISING STEEL-BASED SHOT AND METHOD FOR PRODUCING SAID MATERIAL

BACKGROUND OF THE INVENTION

The invention relates to a composite material obtained by mixing with water a composition comprising:

- a hydraulic binder formed by cement having a tricalcium aluminate content at least less than 5% in weight with respect to the total weight of hydraulic binder,
- steel-based shot having a granulometric distribution comprised between 120 μm and 3000 μm,
- non-densified silica fume having a granulometry less than or equal to 2 μm,
- a highly water-reducing superplasticizer, the ratio between the weight quantity of water and the weight quantity of hydraulic binder being comprised between 0.16 and 0.25.

The invention also relates to a method for producing such a composite material.

STATE OF THE ART

To protect certain parts against abrasion, in particular in industrial applications, it is known to use elements made from special steels or from minerals with a high hardness, generally presenting very high mechanical performances so as to limit their thickness. Special steels or minerals with a high hardness are however not very practical to implement as they have to be melted in order to be able to be shaped. Thus, they can be cast in a mold and fixed mechanically onto the parts to be protected, after they have been cooled, or they can be directly applied hot onto the parts to be protected.

In civil engineering, concretes or mortars can be used in the field of protection against wear or forcible entry. They present the advantage of being easy to implement as they can be cast in a mold at ambient temperature. However, the mechanical performances of concretes or mortars are much lower than those of metallic elements or minerals with a high hardness such as electrically melted minerals. Thus, in the document WO-A-9.013.524, a fabricated article comprises three types of inorganic solid particles having distinct granulometric classes, for example silica fume having a grain size of less than 2 μm, cement having a granulometry comprised between 2 and 7 μm and a mixture of metallic particles and calcinated bauxite having a granulometry less than 100 μm. Such formulations are moreover very onerous as they require the use of very large quantities of fine and ultrafine particles, and calcinated bauxite is relatively expensive.

To improve the mechanical performances of concretes and mortars, it is known to incorporate metal or organic fibers in the cement matrix, and to possibly complete shaping in a mold by lamination. For example, the document EP-A-0.934.915 describes a very high-performance concrete, offering a relatively good abrasion resistance and comprising cement, a mixture of calcinated bauxite sands of different granulometries, silica fume, a water-reducing superplasticizer, an anti-foaming agent and fibers. In like manner, the document FR-A-2.640.962 describes a very high-performance composite concrete, able to limit penetration of projectiles and comprising cement, high-hardness aggregates that can be made of steel or cast iron, micro-silica, water, admixtures formed by fluidizing agents, an anti-foaming agent and metal fibers. Implementation of such fiber concretes does however require the use of special equipment for incorporating the fibers and mixing the fiber concrete, which makes implementation thereof relatively impractical and costly. Moreover, the fibers form local defects in the cement matrix, which, when they emerge on the surfaces, constitute potential tearing sites. They are therefore generally excluded from high-performance coatings.

To protect parts against abrasion, it is also possible to perform assemblies of elements, blocks, slabs or plates made of hard rock such as granite or basalt. But fitting and sealing of these assemblies have to be very meticulously performed to ensure that the coating holds almost immediately and they prove particularly irksome and costly.

In U.S. Pat. No. 4,482,385, it was proposed to add irregular particles of stainless steel to a type III Portland cement-based material to obtain a composite material having a high thermal conductivity and a low permeability to vacuum. The composite material comprises 24.28% weight of Portland cement, 53.45% weight of steel particles, 6.66% weight of water, 3.31% weight of silica fume, 11.82% weight of fine aggregates formed by finely divided crystalline silica, 0.47% weight of superplasticizer and 0.01% weight of anti-foaming agent. The stainless steel particles are used, in the cement-based material, as charges increasing the thermal conductivity of the material and the density thereof (by about 3.5). The steel particles are incorporated in the composite material in the form of two granulometric classes. The composite material thus comprises 34.77% weight of steel particles with a granulometry of 10/25 Mesh (i.e. comprised between 700 and 2000 μm) and 18.68% weight of steel particles with a granulometry of 80/100 Mesh (i.e. comprised between 150 and 180 μm).

The document JP-A-7.276.340 describes a method for producing a high-resistance concrete comprising two types of aggregates of different granulometric classes: rough aggregates formed by iron and grit with a granulometry comprised between 15 and 20 mm and fine aggregates formed by natural aggregates and metallic spheres the size whereof is comprised between 0.08 and 5 mm. The method consists in placing the rough aggregates in a recipient and pressing them, and then injecting a mortar obtained by mixing cement, silica powder, the natural fine aggregates, the metallic fine aggregates and a water-reducing agent into the recipient under pressure. Manufacturing such a high-resistance concrete, with rough aggregates and finer aggregates, also proves to be difficult to implement and relatively costly.

OBJECT OF THE INVENTION

It is one object of the invention to provide a composite material having a very good abrasion resistance, preferably substantially equivalent to that of special steels of electrically melted minerals, while at the same time being easy to formulate and shape when cold and relatively inexpensive.

According to the invention, this object is achieved by the fact that the composition comprises, for 100 parts in weight of hydraulic binder, between 250 and 800 parts in weight of shot and between 10 and 15 parts in weight of silica fume, so as to obtain a composite material having an abrasion index (I) measured according to the C.N.R protocol comprised between 0.15 and 1.0, the value of the D10 grain size of the shot being at least eight times greater than the value of the D90 grain size of the hydraulic binder.

According to a development of the invention, the abrasion index (I) of the composite material is comprised between 0.15 and 0.45.

According to a preferred embodiment, the shot is formed by an iron-based alloy also comprising at least:
- between 0.0 and 3.5% of carbon,
- between 0.0 and 2% of silicon,
- between 0.0 and 2% of manganese,
- between 0.0 and 20% of chromium,
- between 0.0 and 10% of nickel.

According to another feature of the invention, the shot is round or angular.

It is a further object of the invention to provide a method for producing a composite material having an abrasion index comprised between 0.15 and 1.0.

According to the invention, this object is achieved by the fact that the method of production comprises formation of a fresh mixture by successively mixing water, a highly water-reducing superplasticizer, silica fume, cement and steel-based shot, the mixture obtained then being shaped before hardening.

According to a development of the invention, the fresh mixture is formed by previously incorporating and mixing the water, the highly water-reducing superplasticizer, the silica fume and the cement in a high-turbulence mixer so as to form a slurry, the steel shot then being incorporated in the slurry in a mixer.

According to another feature, the fresh mixture is shaped so as to obtain, after hardening, a wear-resistant coating, a shielding or a manufactured protective element.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

A composite material according to the invention is obtained by mixing with water a composition comprising:

- 100 parts in weight of a hydraulic binder,
- between 250 and 800 parts in weight of steel-based shot, and preferably between 350 and 550 parts in weight of steel-based shot,
- between 10 and 15 parts in weight of non-densified silica fume,
- a highly water-reducing superplasticizer, preferably formed by an acrylic copolymer specifically developed to greatly reduce the proportion of water,
- and possibly an anti-foaming agent.

The hydraulic binder is formed by cement having a tricalcium aluminate content of less than 5% with respect to the total weight of binder and preferably less than 3%. The cement is preferably a pure Portland cement such as Portland cement class CEM I 52.5 PM.ES according to the European Standard EN 197-1.

Figure 1:
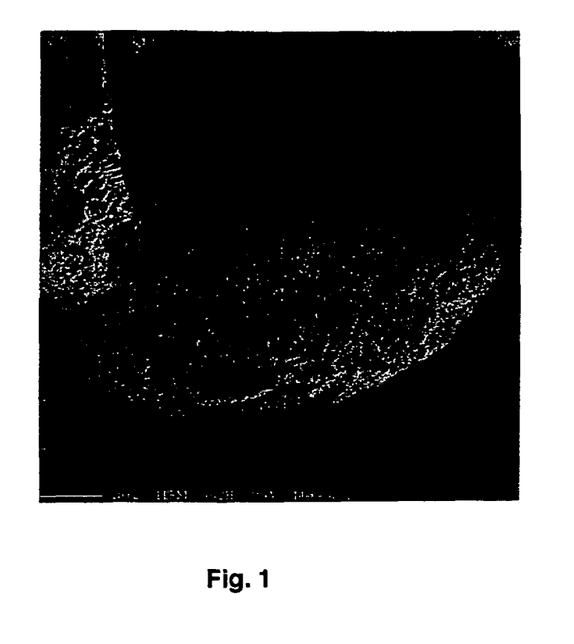
FIGS. 1 and 2 represent images obtained by scanning electron microscopy of respectively angular and round shot particles.
Figure 2:
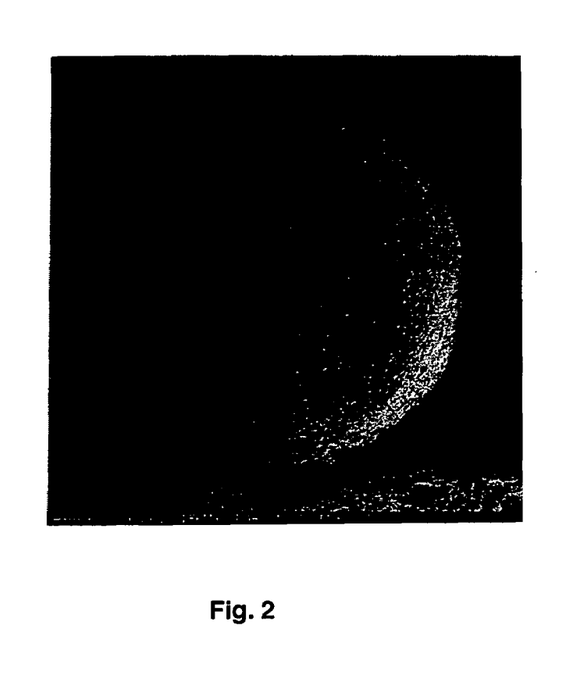

The steel-based shot is formed by a plurality of steel-based grains the granulometric distribution whereof is comprised between 120 µm and 3000 µm and preferably between 500 and 1200 µm. It is preferably angular or round, and abrasive. By angular or round steel-based shot, we mean that most of the grains constituting the shot are angular or round, as illustrated in FIGS. 1 and 2. The shot is preferably formed by an iron-based alloy also comprising at least:
- between 0.0 and 3.5% of carbon,
- between 0.0 and 2% of silicon,
- between 0.0 and 2% of manganese,
- between 0.0 and 20% of chromium,
- between 0.0 and 10% of nickel.

Preferably, the iron-based alloy comprises at least from 0.0 to 1.2% of carbon, from 0.0 to 1.2% of silicon, from 0.0 to 1.2% of manganese, from 0.0 to 1.2% of chromium and from 0.0 to 0.3% of nickel.

The composition enabling the composite material to be obtained can comprise a type of shot or a mixture of at least two types of shot, differing from one another by their granulometric distribution.

The silica fume is non-densified and has a granulometry less than or equal to 2 µm. For example, the silica fume can be a silica fume such as that coming from the Pechiney Anglefort plant.

The anti-foaming agent is designed to reduce the porosity of the composite material after hardening. For example, the anti-foaming agent used can be Cimparement® marketed by the AXIM company. The highly water-reducing superplasticizer is preferably chosen from the ranges of CIMFLUID® products marketed by the AXIM company and preferably from the range referenced ALLEGRO®.

The ratio between the weight quantity of water and the weight quantity of hydraulic binder constituted by cement, also called the Water over Cement or W/C ratio, is comprised between 0.16 and 0.25 and preferably between 0.20 and 0.25. Such a W/C ratio enables a slurry, also called a paste, having a good fluidity to be obtained, which makes the addition of a maximum quantity of shot easier, preferably in the final phase, for a fixed workability of the fresh mixture ready for shaping.

The value of the D10 grain size of the shot is at least eight times greater than the value of the D90 grain size of the hydraulic binder. By D10 grain size of the shot and D90 grain size of the cement, what is respectively meant is sieve sizes the undersize whereof respectively constitutes 10% and 90% of the total volume of the shot and cement grains. Such a ratio between the D10 value of the shot and the D90 value of the cement in particular enables a maximum compactness of the paste to be obtained therefore enabling very high mechanical performances to be achieved for the composite material. Thus for example, for a cement having a D90 grain size of 50 µm, the shot will have a D10 grain size greater than 400 µm.

The composite material can be obtained by any type of known method. It is obtained by forming a fresh mixture, from a successive mixture of water, highly water-reducing superplasticizer, anti-foaming agent if applicable, silica fume, cement and shot. The fresh mixture is preferably formed by previously incorporating and mixing the water, the highly water-reducing superplasticizer, the silica fume and the cement in a high-turbulence mixer so as to form a slurry, the steel shot then being incorporated in the slurry in a mixer. A small quantity of water, for example about 2% compared with the quantity of cement, can be added in the mixer, once the slurry has formed, so as to adjust the workability of the slurry.

The fresh mixture is then shaped before being hardened. For example, the fresh mixture is shaped so as to obtain, after hardening, a wear-resistant coating, a shielding or a manufactured protective element which can for example be machined. The fresh mixture can for example be shaped by being cast in a mold so as to obtain the final shape of the composite material then, once it has hardened, it is lifted from the mold. It can also be shaped by injection, by thixoforming, by extrusion, or by projection in situ. In addition, it can then undergo a thermal treatment after shaping.

The density of such a composite material is comprised between 4000 and 6000 kg/m$^3$ and preferably between 4500 and 5200 kg/m$^3$. Such a density ensures that the composite material has a good impact strength and is not fragile.

Figure 3:
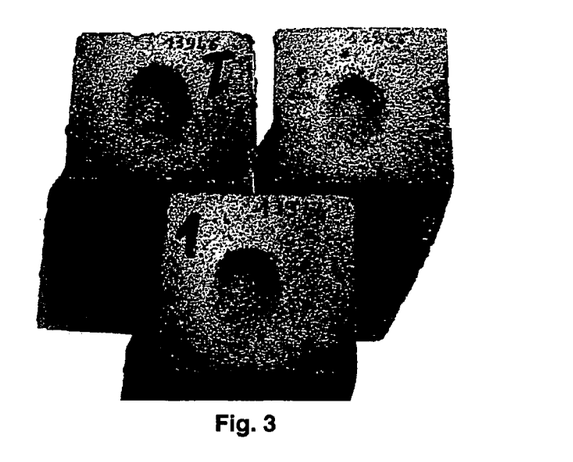
FIG. 3 represents a snapshot of test pieces made of composite material having undergone an abrasion test.

The abrasion resistance of such a composite material was measured on an abrasion test bench developed by the Compagnie Nationale du Rhone (C.N.R) for the purposes of reproducing in the laboratory the abrasion conditions encountered in hydraulic structures. Specimens of material to be tested are immersed in a tank and are attacked by a jet of water charged with sand, at an angle of 45°, for a period of time comprised between 15 nm and 75 nm. The sand-charged water jet creates an imprint in each test specimen as illustrated in FIG. 3. The volume of each imprint is measured by weighing using mercury. In parallel, tests are carried out on glass of large thickness. The results of these weighings are an abrasion index I corresponding to the ratio of the volume of the imprint created on the material over the mean volume of the imprints created on the glass. The abrasion index I is lower the higher the wear and abrasion resistance, and it can vary within a range of values comprised between a few tenths for the most resistant materials and 5 or 10 for the least resistant materials. For example purposes, the table below presents the abrasion index of different materials:

| Material | Abrasion index I |
| --- | --- |
| Natural granite | 0.5 |
| Electrically melted basalt | 0.16 |
| Electrically melted alumina | 0.01 |
| Standard concrete | 2.5 |
| Ultra-high performance concrete | 1.25 |

The abrasion index (I) of a composite material according to the invention, measured on the abrasion test bench according to the protocol developed by the C.N.R. is comprised between 0.15 and 1.0, and preferably between 0.15 and 0.45. Thus, the presence of shot in a large proportion in a composite material according to the invention, and the ratio between the D10 of the shot and the D90 of the cement, enable a composite material to be obtained presenting not only a high abrasion resistance but also high mechanical performances and a good adhesion to metal. Thus, a composite material according to the invention can have a flexural strength at 28 days comprised between 15 and 30 MPa and preferably between 25 and 30 MPa, and a compression strength at 28 days comprised between 150 and 300 MPa.

Figure 6:
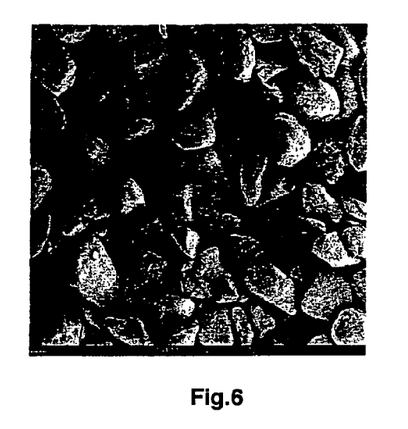
FIGS. 6 to 8 respectively represent an image obtained by scanning electron microscopy, an image obtained by energy dispersive X-ray spectrometry and a granulometric analysis of a first steel-based shot.
Figure 9:
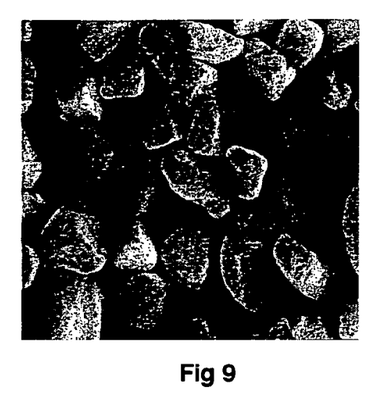
FIGS. 9 to 11 respectively represent an image obtained by scanning electron microscopy, an image obtained by energy dispersive X-ray spectrometry and a granulometric analysis of a second steel-based shot.
Figure 12:
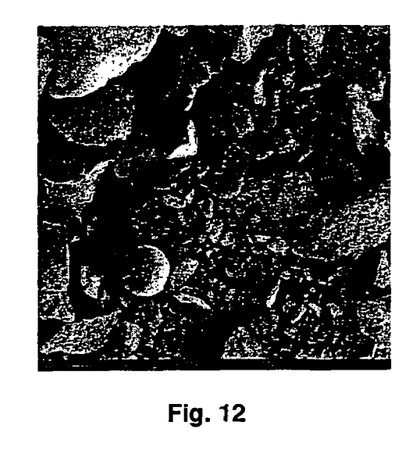
FIGS. 12 to 14 respectively represent an image obtained by scanning electron microscopy, an image obtained by energy dispersive X-ray spectrometry and a granulometric analysis of a third steel-based shot.

For example, different formulations of composite materials were produced and tested with five types of shots 1 to 5. Observation under a scanning electron microscope coupled with an elementary analysis by energy dispersal spectrometry (EDS) shows, in FIGS. 6, 9, 12, that the shots 1 and 2 are formed by substantially rounded particles whereas the shot 3 is formed by a few rounded particles and by particles forming angular beads (FIG. 12). The shot 4 is a round shot and the shot 5 is angular and is formed by bulky grains with very sharp edges. As illustrated by the images obtained by energy dispersal spectrometry represented in FIGS. 7, 10, 13 and 15, the shots 1, 2, 3, 4 and 5 are mainly composed of iron, carbon, silicon and manganese to which particular chemical elements are associated in the form of traces.

Figure 7:
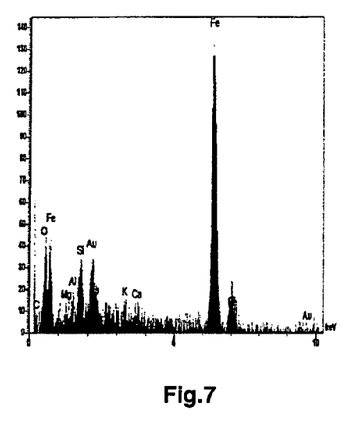
Figure 8:
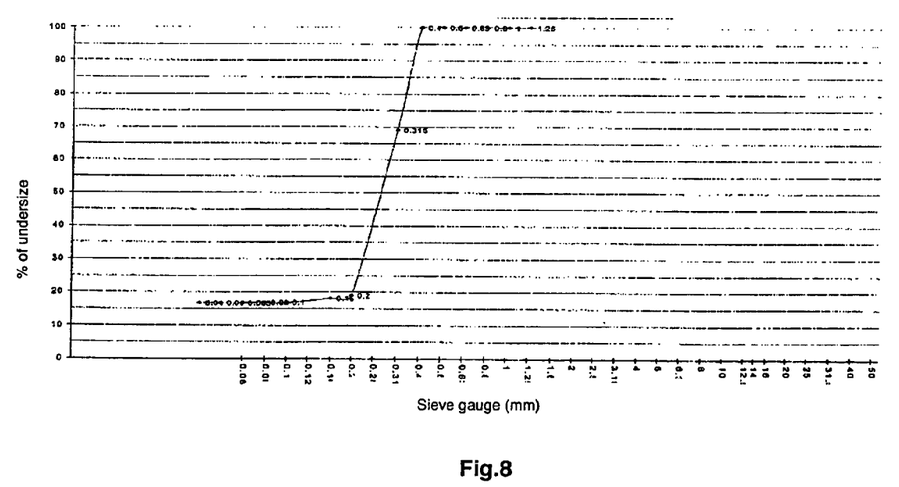
Figure 10:
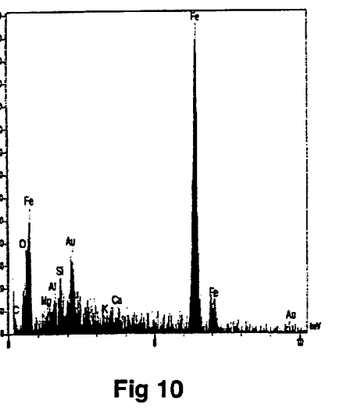
Figure 11:
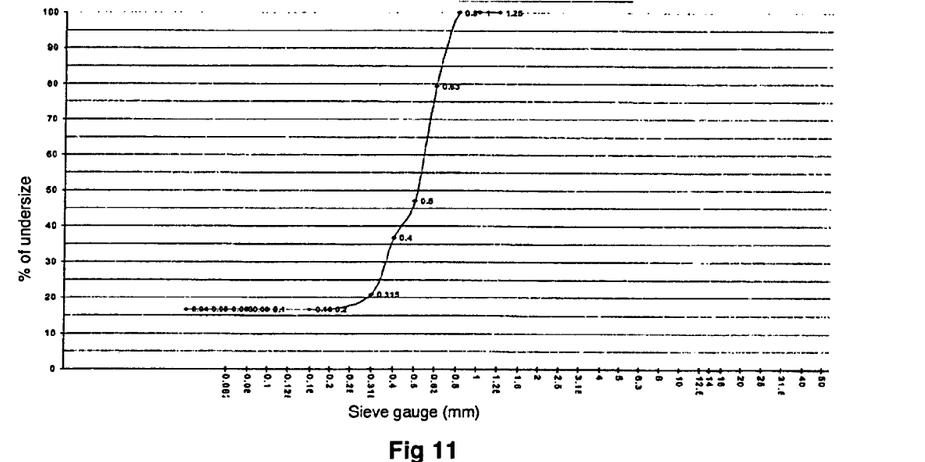
Figure 13:
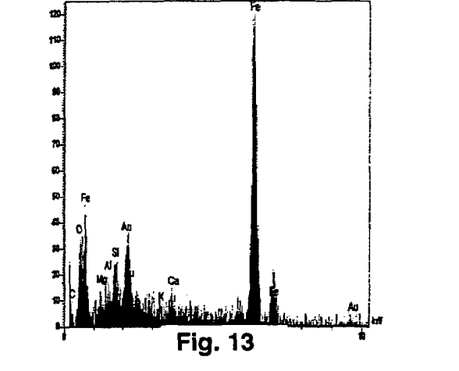
Figure 14:
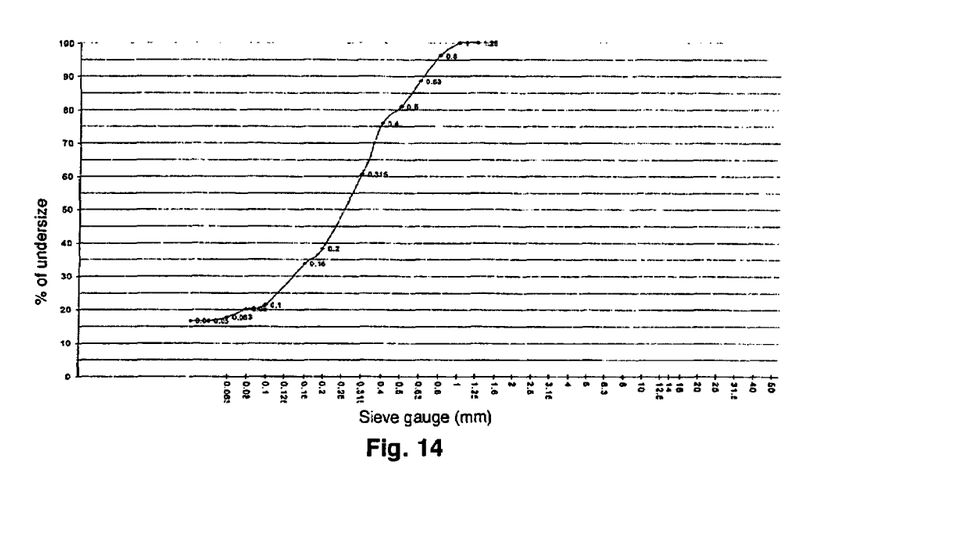
Figure 15:
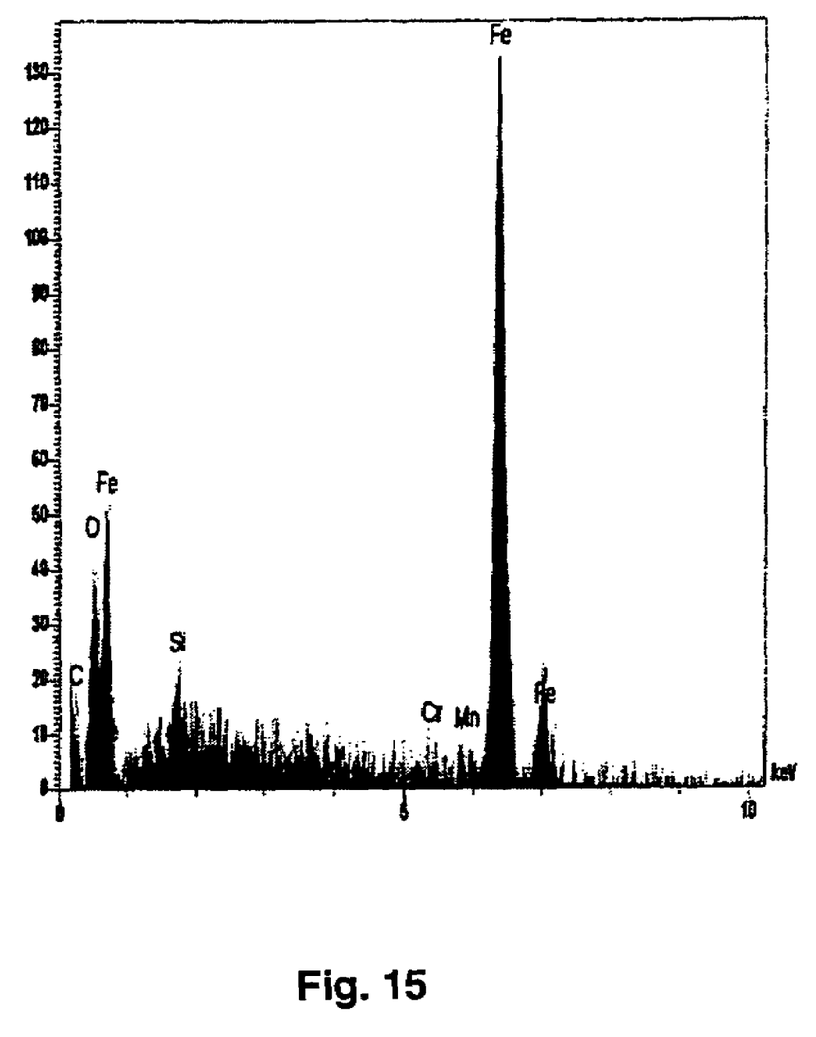
FIG. 15 represents an image obtained by energy dispersive X-ray spectrometry of a fourth steel-based shot.

The granulometric distributions of the shots 1, 2 and 3 are respectively represented in FIGS. 8, 11 and 14. The granulometric distributions of the different classes of shot were determined by means of sieves conventionally used to determine the granulometric distribution of concrete granulates, according to the French Standard NF P 18-560. Thus, as illustrated in FIGS. 7, 10 and 13, the granulometry of the shot 1 is comprised between 200 μm and 400 μm whereas the granulometric distributions of the shots 2 and 3 are respectively comprised between 250 μm and 800 μm and 100 μm and 1250 μm. The grading ranges of the shots 1 and 2 are very narrow whereas that of the shot 3 is broader. The granulometry of the shot 4 is comprised between 700 and 1400 μm and that of the shot 5 is comprised between 1000 and 2000 μm.

The shots 1, 2, 3 respectively have an absolute density of 7.01, 7.35 and 6.65, and a proper compactness of 0.68, 0.72, 0.69. The compactness of each shot was measured by placing 7.5 kg of shot in a non-shrinking metal mold closed by a piston exerting a pressure of 10 kPa. The mold is then fixed to a vibrating table and is subjected to a vibration of 150 Hz for 4 minutes. The compactness is then obtained by the following relation: $C = M/(d*V)$, where M is the weight of the sample in kg, d the density in g/cm$^3$ and V the final volume in m$^3$.

The formulations made with these different shots are illustrated in table 1 below.

| Formulation in g | Cement | Silica fume | Sand | Shot 1 | Shot 2 | Shot 3 | Shot 4 | Shot 5 | Water reducing agent | Anti-foaming agent | W/C |
| --- | --- | --- | --- | --- | --- | --- | --- | --- | --- | --- | --- |
| Ref-1 | 1012.4 | 151.7 | 996 | — | — | — | — | — | 30.43 | 10.1 | 0.20 |
| Ref-2 | 996.3 | 149.3 | 996 | — | — | — | — | — | 29.9 | 10.0 | 0.21 |
| F-1 | 996.3 | 149.3 | — | — | 2762.1 | — | — | — | 29.9 | 10.0 | 0.21 |
| F-2 | 996.3 | 149.3 | — | 658.6 | 2071.6 | — | — | — | 29.9 | 10.0 | 0.21 |
| F-3 | 811 | 121.5 | — | — | 3675 | — | — | — | 24.3 | 8.1 | 0.20 |

-continued

| Formulation in g | Cement | Silica fume | Sand | Shot 1 | Shot 2 | Shot 3 | Shot 4 | Shot 5 | Water reducing agent | Anti-foaming agent | W/C |
|---|---|---|---|---|---|---|---|---|---|---|---|
| F-4 | 785.5 | 117.7 | — | — | 3675 | — | — | — | 23.6 | 7.79 | 0.22 |
| F-5 | 1005.8 | 150.7 | — | 701 | 2205 | — | — | — | 30.2 | 10.0 | 0.18 |
| F-6 | 838.2 | 125.6 | — | 876.3 | 2756.3 | — | — | — | 25.1 | 8.4 | 0.18 |
| F-7 | 670.5 | 100.5 | — | 1051.5 | 3307.5 | — | — | — | 20.1 | 6.7 | 0.20 |
| F-8 | 852.5 | 127.8 | — | 876.3 | 2756.3 | — | — | — | 25.6 | 8.5 | 0.17 |
| F-9 | 852.5 | 127.8 | — | — | 3675 | — | — | — | 25.6 | 8.5 | 0.17 |
| F-10 | 852.5 | 127.8 | — | — | — | 3325 | — | — | 25.6 | 8.5 | 0.19 |
| F-11 | 815.9 | 122.3 | — | — | 3675 | — | — | — | 28.6 | 12.2 | 0.18 |
| F-12 | 805.4 | 120.7 | — | 908.1 | 2725.4 | — | — | — | 28.2 | 12.1 | 0.19 |
| F-13 | 750.9 | 112.6 | — | — | — | 3390 | — | — | 26.3 | 11.3 | 0.24 |
| F-14 | 4045.3 | 603.8 | — | — | — | — | 18225 | — | 121.4 | 80.9 | 0.17 |
| F-15 | 4045.3 | 603.8 | — | — | — | — | — | 18750 | 121.4 | 80.9 | 0.17 |
| F-16 | 740.9 | 111.1 | — | — | — | 3375 | — | — | 25.9 | 11.1 | 0.247 |

All the formulations F1 to F16 were made according to the same method. The components were mixed using a high-turbulence mixer in the following manner:
- incorporating water, additives and silica fume, and stirring the mixture for 1 minute,
- incorporating the cement and stirring the mixture for 1 minute so as to obtain a very workable to fluid paste,
- incorporating the shot and mixing the mixture until homogenization is achieved,
- addition of water so as to adjust the workability to the application, up to a maximum of 2% of the weight of cement.

The formulations Ref-1 and Ref-2 correspond to formulations according to the prior art comprising quartz sand whereas the formulations F-1 to F-16 correspond to formulations of composite materials according to the invention.

The formulations F-1, F-3, F-4, F-9 and F-11 comprise only type 2 shot whereas the formulations F-2, F-5, F-6, F-7, F-8 and F-11 comprise substantially 25% in weight of type 1 shot and 75% in weight of type 2 shot. The formulations F-10, F-13 and F-16 comprise only type 3 shot, the formulation F-14 comprises only type 4 shot and the formulation F-15 comprises only type 5 shot.

Table 2 below indicates the theoretical density, theoretical volume, true density and apparent density values as well as the porosity accessible to water of the formulations given in table 1.

TABLE 2

| Formulation in g | Theoretical density in kg/m³ | Theoretical volume in ml | True density in g/cm³ | Apparent density in g/cm³ | Porosity in % |
|---|---|---|---|---|---|
| Ref-1 | 2430 | 980 | 2.35 | 2.29 | 6.1 |
| Ref-2 | 2420 | 980 | 2.34 | 2.27 | 6.8 |
| F-1 | 4220 | 980 | 4.25 | 4.16 | 8.6 |
| F-2 | 4190 | 980 | 4.20 | 4.12 | 7.8 |
| F-3 | 4860 | 985 | 4.80 | 4.75 | 5.3 |
| F-4 | 4840 | 985 | 4.82 | 4.77 | 5.8 |
| F-5 | 4350 | 980 | 4.30 | 4.24 | 5.4 |
| F-6 | 4835 | 985 | 4.78 | 4.74 | 4.4 |
| F-7 | 5280 | 1000 | 5.13 | 5.09 | 4.3 |
| F-8 | 4870 | 980 | 4.80 | 4.76 | 3.7 |
| F-9 | 4920 | 980 | 4.81 | 4.77 | 4.3 |
| F-10 | 4560 | 980 | 4.51 | 4.44 | 7.0 |
| F-11 | 4654 | — | 4.77 | 4.71 | 2.2 |
| F-12 | 4598 | — | 4.42 | 4.66 | 5.4 |
| F-13 | 4291 | — | 4.50 | 4.45 | 5.0 |
| F-14 | — | — | 4.80 | 4.75 | 4.8 |
| F-15 | — | — | 4.88 | 4.83 | 5.2 |
| F-16 | — | — | 4.41 | 4.36 | 5.6 |

The composite materials thus obtained have a porosity comprised between 4 and 9%, and they are therefore very compact and present a large reduction of the amplitude of endogenous shrinkage after setting compared with the formulations Ref-1 and Ref-2. This reduction enables the risks of potential cracking of the material in its industrial application to be limited.

4*4*16 cm prisms were produced and tested in four-point flexion and in compression. The results are given in table 3 below for the different formulations given in table 1.

TABLE 3

| Formulation in g | Sflexural-7 days MPa | Sflexural-14 days MPa | Sflexural-28 days MPa | Scompression-28 days MPa |
|---|---|---|---|---|
| Ref-1 | 10.1 | — | — | — |
| Ref-2 | 10.0 | — | — | — |
| F-1 | 9.4 | — | — | — |
| F-2 | 9.4 | — | — | — |
| F-3 | 21.0 | — | — | — |
| F-4 | 20.3 | — | — | — |
| F-5 | 22.0 | — | — | — |
| F-6 | 22.3 | — | — | — |
| F-7 | 19.3 | — | — | — |
| F-8 | — | 26.6 | — | — |
| F-9 | — | 24.2 | — | — |
| F-10 | — | 19.4 | — | — |
| F-11 | 22.0 | — | 27.7 | 240 |
| F-12 | 21.3 | — | 28.7 | 250 |
| F-13 | 20.7 | — | 25.8 | 225 |
| F-14 | — | — | 26.4 | — |
| F-15 | — | — | 27.6 | — |
| F-16 | 16.8 | — | 23.6 | — |

The flexural strength at 7 days is comprised between 9.4 MPa and 23.0 MPa for the formulations F-1 to F-16 and the compression strength at 28 days is comprised between 225 and 250 MPa for the formulations F-11 to F-13. It can be observed that the flexural strength of such formulations is much higher than that of the reference formulations Ref-1 and Ref-2. In addition, according to a recent study by Atis et al., in the article "Relation between abrasion resistance and flexural strength of high volume fly ash concrete" (Materials and structures, vol 35, May 2002, pages 257-260), the flexural strength can be correlated to the abrasion resistance, which implies a high abrasion resistance.

The abrasion resistance of the formulations F-11 to F-15 was tested according to the test bench developed by the Compagnie Nationale du Rhône, their abrasion index being given in table 4 below.

TABLE 4

| Formulation | Abrasion index |
|---|---|
| F-11 | 0.43 |
| F-12 | 0.57 |
| F-13 | 0.35 |
| F-14 | 0.23 |
| F-15 | 0.18 |

Thus, the composite materials according to the invention present not only an excellent abrasion resistance, greater than that of the reference granite of the CNR test, but also an excellent flexural and compression strength and an excellent adhesion to metal.

A series of 20 test specimens was made up in order to characterize the adhesion of the composite material obtained from the formulation F-13 to metal. To do this, unfurled metal grids were welded to 100*100*4 mm standard steel plates and a layer of latex was applied to each grid. A layer of about 8 mm of the paste obtained from the formulation F-13 was applied to the surface of the steel plates.

The test specimens thus prepared were kept for 28 days at a temperature of about 20° C. and three series of 5 test specimens were subjected to thermal treatments respectively of 70° C., 120° C. and 170° C. and a fourth series of 5 test specimens were tested after being kept at 20° C.

The adhesion tests were carried out in accordance with the French standard NF P 18-852 using a bellows dynamometer with a capacity equal to 16 kN. These tests comprise the following steps:

coring a space in the plate, under water, the space having a diameter of 20 mm up to the unfurled metal level, after a drying period at 20° C., pads with a diameter of 20 mm were stuck onto the plates by means of an adhesive resin such as the one known under the name of Sikapur® marketed by the Sika company.

performing the tests after the glue has completely dried.

Figure 4:
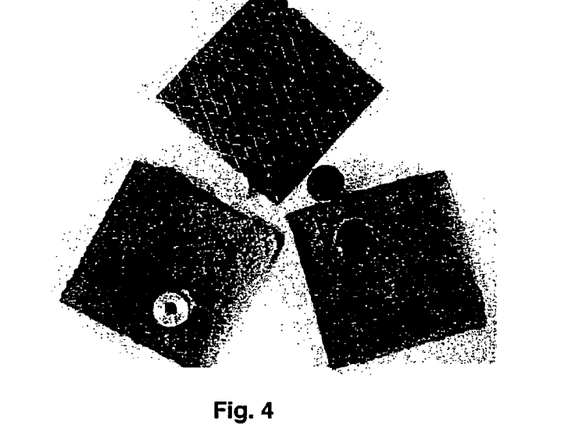
FIGS. 4 and 5 illustrate a composite material undergoing an adhesion test to metal.

FIG. 4 illustrates a standard steel plate on which the unfurled steel grid is placed, a cored plate comprising a pad and a plate after the tearing test.

The results of the tearing tests are given in table 5 below.

TABLE 5

| Test N° | T° | | | |
|---|---|---|---|---|
| | 20° C. | 70° C. | 120° C. | 150° C. |
| Test 1 | >16 kN | >16 kN | >16 kN | >16 kN |
| Test 2 | >16 kN | >16 kN | >16 kN | >16 kN |
| Test 3 | >16 kN | >16 kN | >16 kN | >16 kN |
| Test 4 | >16 kN | >16 kN | >16 kN | >16 kN |
| Test 5 | 12.85 kN | 12.85 kN | >16 kN | >16 kN |
| Type of breaking | At the base of the grid | At the base of the grid | — | — |

Figure 5:
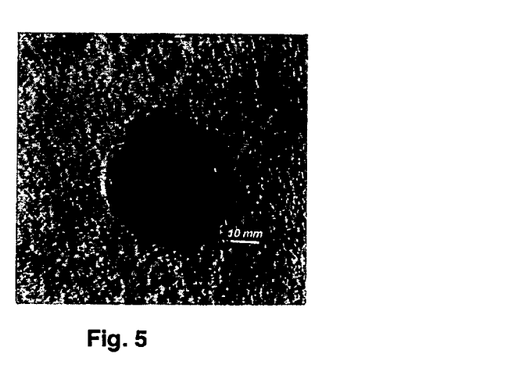

The results of these tests show a very good adhesion between the formulation F-13 and the steel plate, whatever the temperature at which the test specimens were previously exposed. Indeed, except for two test specimens, the breaking load is mostly greater than the maximum capacity of the apparatus used. The two test specimens of test 5, respectively subjected to temperatures of 20° C. and 70° C., suffered internal breaking, at the base of the unfurled metal grid (FIG. 5), for a load of 12.5 kN. The tensile stress corresponding to the maximum load of 16 kN is equal to 50 Mpa. Thus, in four cases out of five, the tensile adhesion exceeds 50 MPa.

Such a formulation therefore enables a composite material to be obtained having a good adhesion with steel, but also an excellent conservation of its mechanical and physical properties up to at least 150° C. It has in fact been observed that applying thermal cycles at 70° C., 120° C. and 150° C. does not give rise to any loss of flexural strength or to any increase of the porosity accessible to the water.

Figure 16:
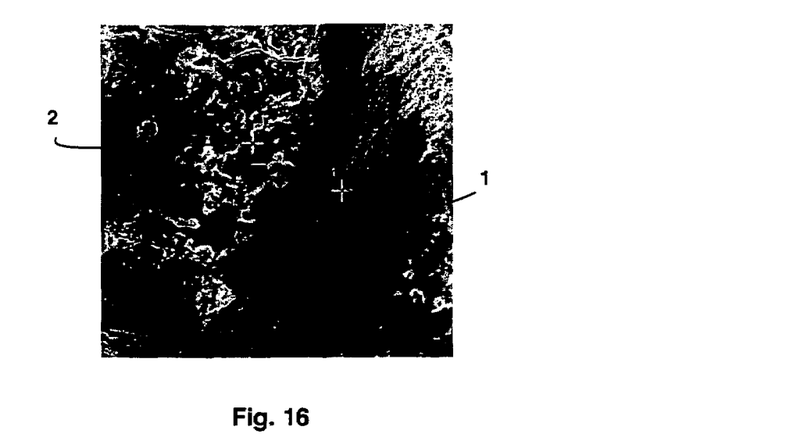
FIGS. 16 to 18 represent images obtained by scanning electron microscopy of a composite material according to the invention.
Figure 17:
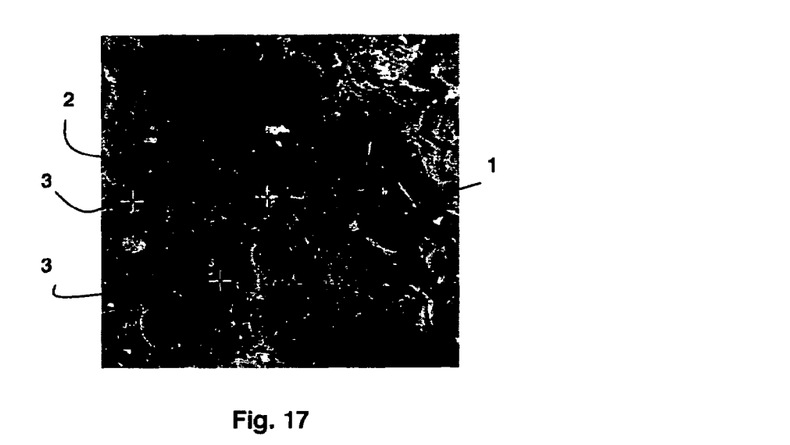
Figure 18:
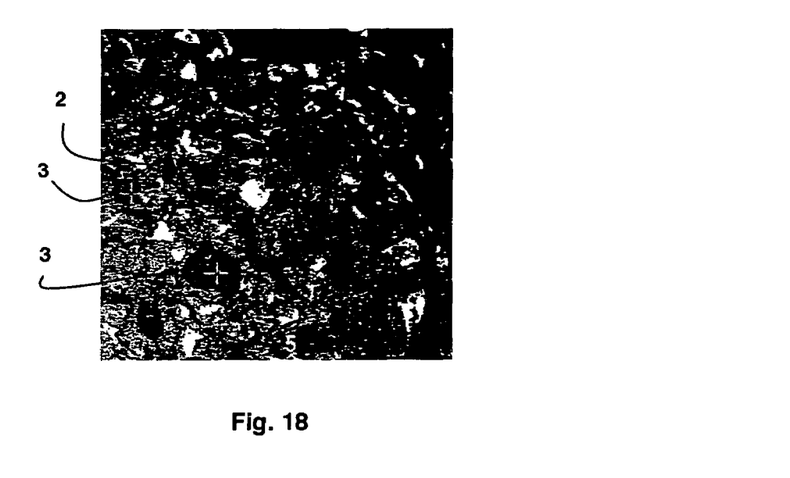

In FIGS. 16 to 18, the composite material, obtained by means of the formulation 13 and kept at 20° C., was observed under the scanning electron microscope. Thus, in FIG. 16, the contact being established between the steel shot 1 and the cement matrix 2 in the composite material prepared 7 days before can be observed. In FIGS. 17 and 18, the composite material prepared 28 days before presents a few air bubbles 3 in the cement matrix 2 as well as cracks formed at the time it was prepared. Thus, it can be observed that at low maturity, the material presents a good general cohesion, the contacts between the cement matrix and the shot being close. The distribution of the shot particles is homogeneous in spite of the presence of a few air bubbles of a diameter generally comprised between 0.2 and 0.8 mm.

Determination of the proportions of the different components constituting the composite material and the choice of a particular granulometry for the steel shot enabled a composite material having a very good abrasion resistance, close to that of special steels and electrically melted minerals, to be obtained. Being able to incorporate a large quantity of steel shot in the composite material, as compared to the quantity of hydraulic binder, and choosing a minimum D10/D90 ratio for the steel shot does in fact enable a composite material presenting a high abrasion resistance to be obtained, but also enables good mechanical performances and a good adhesion to metal to be achieved. Furthermore, such a composite material presents characteristics enabling it to be easy to formulate and to cold shape, and it is relatively inexpensive.

Incorporation of a large quantity of steel shot in the composite material is in particular achieved by obtaining a W/C ratio comprised between 0.16 and 0.25 and preferably between 0.20 and 0.25. In addition, it is not necessary to add other inert charges such as grit or any other natural aggregate to the composite material.

Choosing a minimum D10/D90 ratio equal to 8 for its part enables a maximum compactness of the paste to be obtained when the composite material is manufactured and therefore enables a very dense composite material to be achieved, with a density greater than or equal to 4. The compactness and high density of the composite material in particular enable very good mechanical performances and a good impact strength to be obtained, and they give the composite material a non fragile nature.

Such a composite material can be used in particular in the field of fabricating wear-resistant coatings, for ducts for aerolic transport of abrasive materials, dam spillways, nuclear power plant secondary cooling systems, industrial water or rainwater or household wastewater pipes with high solid flow rate, sludge pumping plants, on concretes in hydraulic constructions . . . Likewise, it can be used to coat hoppers such as those used in shot blasting machines, metal ducts in handling pulverulent powders at temperatures lower than 200° C., industrial floorings subjected to abrasive dusts, or soleplates of industrial machines. It can also be shaped to achieve shieldings to perform protection against forcible entry or against projectiles, such as strongbox armour platings, or to protect sites emitting dangerous radiation. The composite material can also form quasi-metallic elements achieved cold by molding, lamination, rolling, injection, thixoforming, and machinable for cold manufacturing of parts and frames subjected to stresses in operation.

The invention claimed is:

1. Composite material obtained by mixing with water a composition comprising:
   a hydraulic binder formed by cement having a tricalcium aluminate content less than 5% in weight with respect to the total weight of hydraulic binder,
   steel-based shot having a granulometric distribution comprised between 120 µm and 3000 µm,
   non-densified silica fume having a granulometry less than or equal to 2 µm,
   a water-reducing superplasticizer,
   wherein a ratio between a weight quantity of water and a weight quantity of hydraulic binder being comprised between 0.16 and 0.25, and
   wherein the composition comprises, for 100 parts in weight of hydraulic binder, between 250 and 800 parts in weight of shot and between 10 and 15 parts in weight of silica fume, so as to obtain a composite material having an abrasion index measured according to the C.N.R protocol comprised between 0.15 and 1.0, the shot having a value of a D10 grain size at least eight times greater than the value of a D90 grain size of the hydraulic binder.

2. Composite material according to claim 1, wherein the abrasion index of the composite material is comprised between 0.15 and 0.45.

3. Composite material according to claim 1, wherein the ratio between the weight quantity of water and the weight quantity of hydraulic binder is comprised between 0.20 and 0.25.

4. Composite material according to claim 1, wherein the composition comprises, for 100 parts in weight of hydraulic binder, between 350 and 550 parts in weight of shot.

5. Composite material according to claim 1, wherein the shot is formed by an iron-based alloy also comprising at least:
   between 0.0 and 3.5% of carbon,
   between 0.0 and 2% of silicon,
   between 0.0 and 2% of manganese,
   between 0.0 and 20% of chromium,
   between 0.0 and 10% of nickel.

6. Composite material according to claim 5, wherein the shot is formed by an iron-based alloy also comprising at least:
   between 0.0 and 1.2% of carbon,
   between 0.0 and 1.2% of silicon,
   between 0.0 and 1.2% of manganese,
   between 0.0 and 1.2% of chromium,
   between 0.0 and 0.3% of nickel.

7. Composite material according to claim 1, wherein the steel-based shot has a granulometric distribution comprised between 500 and 1200 µm.

8. Composite material according to claim 1, wherein the shot is round.

9. Composite material according to claim 1, wherein the shot is angular.

10. Composite material according to claim 1, wherein the composition comprises a mixture of at least two types of shot, differing by their granulometric distribution.

11. Composite material according to claim 1, wherein the composition comprises an anti-foaming agent designed to reduce porosity of the composite material after hardening.

12. Composite material according to claim 1, wherein density of the composite material is between 4000 and 6000 kg/m$^3$.

13. Method for producing a composite material according to claim 1, comprising formation of a fresh mixture by successively mixing water, a water-reducing superplasticizer, silica fume, cement and steel-based shot, the mixture then being shaped before hardening.

14. Method for producing a composite material according to claim 13, wherein the fresh mixture is formed by incorporating and previously mixing the water, the water-reducing superplasticizer, the silica fume and the cement in a mixer so as to form a slurry, the steel shot then being incorporated in the slurry in a mixer.

15. Method for producing a composite material according to claim 14, wherein a quantity of water is added in the mixer, once the slurry has been formed, so as to adjust workability of the slurry.

16. Method for producing a composite material according to claim 3, wherein a fresh mixture is shaped so as to obtain, after hardening, a wear-resistant coating composition, a shielding element or a manufactured protective element.

17. Method for producing a composite material according to claim 16, wherein shaping is performed by molding of the fresh mixture.

18. Method for producing a composite material according to claim 16, wherein shaping is performed by injection of the fresh mixture.

19. Method for producing a composite material according to claim 16, wherein shaping is performed by thixoforniing of the fresh mixture.

20. Method for producing a composite material according to claim 16, wherein shaping is performed by extrusion of the fresh mixture.

21. Method for producing a composite material according to claim 16, wherein shaping is performed by projection, in situ, of the fresh mixture.

22. Method for producing a composite material according to claim 16, wherein the fresh mixture undergoes a thermal treatment after it has been shaped.

23. Method for producing a composite material according to claim 16, wherein the wear-resistant coating composition, the shielding element or the manufactured protective element obtained is machined.

* * * * *